US012621818B2

(12) United States Patent
Li et al.

(10) Patent No.: US 12,621,818 B2
(45) Date of Patent: May 5, 2026

(54) BEAM FAILURE RECOVERY METHOD AND APPARATUS

(71) Applicant: HUAWEI TECHNOLOGIES CO., LTD., Shenzhen (CN)

(72) Inventors: Tie Li, Beijing (CN); Yongping Zhang, Beijing (CN); Xi Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/667,071

(22) Filed: Feb. 8, 2022

(65) Prior Publication Data

US 2022/0167339 A1      May 26, 2022

Related U.S. Application Data

(63) Continuation of application No. PCT/CN2020/107911, filed on Aug. 7, 2020.

(30) Foreign Application Priority Data

Aug. 9, 2019    (CN) .......................... 201910736673.6

(51) Int. Cl.
H04W 24/00        (2009.01)
H04B 7/06         (2006.01)
                   (Continued)

(52) U.S. Cl.
CPC ...... H04W 72/046 (2013.01); H04B 7/06964 (2023.05); H04W 24/04 (2013.01); H04W 72/21 (2023.01); H04W 72/23 (2023.01)

(58) Field of Classification Search
None
See application file for complete search history.

(56) References Cited

U.S. PATENT DOCUMENTS

2018/0278467 A1* 9/2018 John Wilson ......... H04W 72/21
2019/0075014 A1  3/2019 Zhou et al.
(Continued)

FOREIGN PATENT DOCUMENTS

CN        107547115 A      1/2018
CN        109997397 A      7/2019
(Continued)

OTHER PUBLICATIONS

Extended European Search Report issued in corresponding European Application No. 20852924.8, dated Aug. 25, 2022, pp. 1-9.
(Continued)

*Primary Examiner* — Abdelillah Elmejjarmi
(74) *Attorney, Agent, or Firm* — HAUPTMAN HAM, LLP

(57)            ABSTRACT

This application provides a beam failure recovery method and an apparatus to reduce implementation complexity of a terminal in a BFR procedure. The method includes: A terminal receives configuration information sent by a network device, where the configuration information is used to indicate one or more uplink signal resources; the terminal sends an uplink signal based on the configuration information, and the network device measures the uplink signal and determines beam quality of an uplink resource corresponding to the uplink signal; and the network device sends a first response message to the terminal based on a measurement result of the uplink signal when a beam failure occurs, so that the terminal determines that a beam failure recovery succeeds. The technical solutions in this application are applicable to the BFR procedure.

20 Claims, 8 Drawing Sheets

(51) Int. Cl.

| | |
|---|---|
| *H04W 24/04* | (2009.01) |
| *H04W 72/044* | (2023.01) |
| *H04W 72/21* | (2023.01) |
| *H04W 72/23* | (2023.01) |

(56) References Cited

U.S. PATENT DOCUMENTS

| | | | | |
|---|---|---|---|---|
| 2019/0081691 | A1 | 3/2019 | Nagaraja et al. | |
| 2020/0077283 | A1* | 3/2020 | Zhou | H04W 24/04 |
| 2020/0107331 | A1* | 4/2020 | Tsai | H04B 7/088 |
| 2020/0336189 | A1* | 10/2020 | Venugopal | H04B 7/088 |
| 2021/0006321 | A1* | 1/2021 | Wang | H04W 16/28 |
| 2021/0105171 | A1* | 4/2021 | Chen | H04B 7/0695 |
| 2021/0185754 | A1* | 6/2021 | Da Silva | H04W 76/19 |
| 2021/0204221 | A1* | 7/2021 | Zhou | H04W 72/20 |
| 2023/0170979 | A1* | 6/2023 | Kang | H04B 7/0888 |
| | | | | 375/347 |

FOREIGN PATENT DOCUMENTS

| | | |
|---|---|---|
| CN | 110034799 A | 7/2019 |
| CN | 110035441 A | 7/2019 |
| WO | 2019051231 A1 | 3/2019 |

OTHER PUBLICATIONS

R1-1907317, Nokia et al., Enhancements on Multi-beam Operation, 3GPP TSG RAN WG1 #97 Meeting, Reno, Nevada, USA, May 13-May 17, 2019, total 23 pages.

R1-1804788, Qualcomm, Beam failure recovery procedure, 3GPP TSG-RAN WG1 #92b, Sanya, China, Apr. 16-Apr. 20, 2018, total 10 pages.

3GPP TS 38.213 V15.6.0 (Jun. 2019)3rd Generation Partnership Project;Technical Specification Group Radio Access Network;NR;Physical layer procedures for control(Release 15), total 107 pages.

3GPP TS 38.133 V15.6.0 (Jun. 2019), 3rd Generation Partnership Project;Technical Specification Group Radio Access Network;NR-;Requirements for support of radio resource management(Release 15), total 1002 pages.

International Search Report issued in corresponding International Application No. PCT/CN2020/107911, dated Oct. 28, 2020, pp. 1-8.

Chinese Office Action issued in corresponding Chinese Application No. 201910736673.6, dated Sep. 27, 2021, pp. 1-8 . . . .

* cited by examiner

BEAM FAILURE RECOVERY METHOD AND APPARATUS

CROSS-REFERENCE TO RELATED APPLICATIONS

This application is a continuation of International Application No. PCT/CN2020/107911, filed on Aug. 7, 2020, which claims priority to Chinese Patent Application No. 201910736673.6, filed on Aug. 9, 2019. The disclosures of the aforementioned applications are hereby incorporated by reference in their entireties.

TECHNICAL FIELD

This application relates to the field of communication technologies, and in particular, to a beam failure recovery method and an apparatus.

BACKGROUND

Compared with a long term evolution (long term evolution, LTE) communication system that uses a low frequency band, a high frequency band is added to a fifth generation (5th generation, 5G) new radio (new radio, NR) communication system to implement a larger bandwidth and a higher transmission rate. When a frequency of a signal is high, the signal suffers severe fading during spatial propagation. Therefore, a hybrid beamforming technology is used in the 5G NR communication system to improve a directional power in a transmission direction, to obtain a good directional gain, improve a signal-to-interference-noise ratio at a receive end, and further improve performance of the 5G NR communication system.

In the 5G NR communication system, because both a base station and a terminal use a hybrid beamforming technology, beam management needs to be performed between the terminal and the base station. By using an uplink and downlink beam management function, the base station and the terminal may align a transmit beam with a receive beam, thereby ensuring normal communication on a transmit link and a receive link between the base station and the terminal.

To ensure robustness of the transmit link and the receive link, two functions are further defined in a 5G protocol: a radio link failure (radio link failure, RLF) and a beam failure recovery (beam failure recovery, BFR). The RLF is used to declare a cell-level radio link failure. The BFR is used to declare that a beam failure occurs in a current cell. The BFR is designed to quickly recover, by using a BFR procedure before the RLF is triggered, from a radio link failure caused by a beam failure.

For the BFR, the base station configures a new beam candidate set for the terminal. The new beam candidate set includes a plurality of downlink reference signal resources, for example, channel state information-reference signal (channel state information-reference signal, CSI-RS) resources. In this way, when a beam of the serving cell fails, the terminal determines beam quality corresponding to each downlink reference signal resource in the new beam candidate set of the serving cell, and then selects an available beam and reports the available beam to the base station to implement a beam recovery.

Currently, in the BFR procedure, the terminal needs to measure signals carried by the plurality of downlink reference signal resources in the new beam candidate set, to determine the beam quality corresponding to each downlink reference signal resource in the new beam candidate set. This increases implementation complexity of the terminal in the BFR procedure.

SUMMARY

Embodiments of this application provide a beam failure recovery method and an apparatus to reduce implementation complexity of a terminal in a BFR procedure.

According to a first aspect, a beam failure recovery method is provided. The method includes: A terminal receives configuration information sent by a network device, where the configuration information is used to indicate M uplink signal resources, and M is a positive integer; the terminal sends an uplink signal based on the configuration information; and the terminal receives a first response message based on the uplink signal when a beam failure occurs, where the first response message is used to determine that a BFR succeeds.

Based on the foregoing technical solution, the terminal receives the configuration information sent by the network device to learn of the plurality of uplink signal resources. In this way, the terminal may send the uplink signal based on the configuration information, and the network device measures the uplink signal to determine beam quality of the plurality of uplink signal resources. Based on beam reciprocity, after the network device finishes measuring an uplink, the network device may determine a transmit beam, used for a downlink, of the network device. In addition, the terminal can determine, based on an indication of the network device, a receive beam, used for the downlink, of the terminal. Therefore, when a beam failure occurs, the terminal receives the first response message sent by the network device based on the uplink signal, to complete a beam failure recovery. As can be learned, in the technical solution provided in this embodiment of this application, the terminal does not need to measure a downlink reference signal to determine beam quality of a plurality of downlink reference signal resources, thereby reducing implementation complexity of the terminal in a BFR procedure.

In a possible design, the uplink signal resource is a sounding reference signal (sounding reference signal, SRS) resource.

In a possible design, the SRS resource is an SRS resource used for antenna selection, an SRS resource used for physical uplink shared channel transmission, an SRS resource used for beam management, or an SRS resource used for new beam detection. It may be understood that when the SRS resource is an SRS resource used for antenna selection, a current antenna selection procedure may be reused for candidate beam detection, thereby reducing overheads of a system resource and reducing power consumption of the network device. When the SRS resource is an SRS resource used for beam management, a current beam management procedure may be reused for candidate beam detection, thereby reducing overheads of a system resource and reducing power consumption of the network device. When the SRS resource is an SRS resource used for physical uplink shared channel transmission, a current physical uplink shared channel transmission procedure may be reused for candidate beam detection, thereby reducing overheads of a system resource and reducing power consumption of the network device.

In a possible design, before the terminal sends an uplink signal based on the configuration information, the method further includes: The terminal sends a first request message when a beam failure occurs, where the first request message is used to request a beam failure recovery. In this way, after receiving the first request message, the network device can obtain a measurement result of the uplink signal. Therefore, after receiving the first request message, the network device may directly send the first response message to the terminal based on the previously obtained measurement result of the uplink signal, and does not need to perform a measurement procedure of the uplink signal again, thereby reducing a delay of the BFR.

In a possible design, after the terminal sends an uplink signal based on the configuration information, the method further includes: The terminal sends a first request message when a beam failure occurs, where the first request message is used to request a beam failure recovery. Because the measurement procedure of the uplink signal is performed after a beam failure occurs in a serving cell, the measurement result of the uplink signal obtained by the network device is precise, thereby facilitating selection of a proper new beam.

In a possible design, when the terminal accesses one serving cell, the sending an uplink signal based on the configuration information includes: sending the uplink signal based on the M uplink signal resources.

In a possible design, the first request message includes first indication information, and the first indication information is used to indicate that a beam failure occurs in a serving cell.

In a possible design, the first request message includes second indication information, and the second indication information is used to indicate at least one serving cell in which a beam failure occurs. In this way, when the terminal accesses a plurality of serving cells, the network device may learn, based on the second indication information, of serving cells in which a beam failure occurs.

In a possible design, the first request message includes third indication information, and the third indication information is used to indicate that no new beam has been identified.

In a possible design, when the terminal accesses a plurality of serving cells, at least one of the plurality of serving cells corresponds to at least one of the M uplink signal resources. That the terminal sends an uplink signal based on the configuration information includes: For each of the plurality of serving cells, the terminal sends the uplink signal based on at least one uplink signal resource corresponding to the serving cell.

In a possible design, when the terminal accesses a plurality of serving cells, at least one of the plurality of serving cells corresponds to at least one of the M uplink signal resources. That the terminal sends an uplink signal based on the configuration information includes: For each of the at least one serving cell in which the beam failure occurs, the terminal sends the uplink signal based on at least one uplink signal resource corresponding to the serving cell.

In a possible design, the first response message is used to indicate a new beam of the at least one serving cell in which the beam failure occurs.

In a possible design, the first response message is carried in signaling of a primary cell or a secondary cell in which no beam failure occurs.

In a possible design, a beam for transmitting the first response message is a new beam of the at least one serving cell in which the beam failure occurs.

In a possible design, the configuration information is further used to indicate N downlink signal resources, and N is a positive integer.

In a possible design, the configuration information is used to indicate a resource set. The resource set includes M uplink signal resource, or the resource set includes M uplink signal resources and N downlink signal resources.

In a possible design, the configuration information is used to indicate a first resource set and a second resource set. The first resource set includes M uplink signal resources, and the second resource set includes N downlink signal resources.

According to a second aspect, a beam failure recovery method is provided. The method includes: A network device sends configuration information to a terminal, where the configuration information is used to indicate M uplink signal resources, and M is a positive integer; the network device measures an uplink signal based on the configuration information; the network device sends a first response message the terminal based on a measurement result of the uplink signal when a beam failure occurs, where the first response message is used to enable the terminal to determine that a BFR succeeds.

Based on the foregoing technical solution, the network device sends the configuration information to the terminal, so that the terminal learns of the plurality of uplink signal resources. In this way, the terminal may send the uplink signal based on the configuration information, and the network device measures the uplink signal to determine beam quality of the plurality of uplink signal resources. Based on beam reciprocity, after the network device finishes measuring an uplink, the network device may determine a transmit beam, used for a downlink, of the network device. In addition, the terminal can determine, based on an indication of the network device, a receive beam, used for the downlink, of the terminal. Therefore, when a beam failure occurs, the network device sends the first response message to the terminal based on the measurement result of the uplink signal to complete the beam failure recovery. As can be learned, in the technical solution provided in this embodiment of this application, the terminal does not need to measure a downlink reference signal to determine beam quality of a plurality of downlink reference signal resources, thereby reducing implementation complexity of the terminal in a BFR procedure.

In a possible design, the uplink signal resource is an SRS resource.

In a possible design, the SRS resource is an SRS resource used for antenna selection, an SRS resource used for physical uplink shared channel transmission, an SRS resource used for beam management, or an SRS resource used for new beam detection.

In a possible design, before the network device measures an uplink signal based on the configuration information, the method further includes: The network device receives a first request message sent by the terminal, where the first request message is used to request a beam failure recovery.

In a possible design, after the network device measures an uplink signal based on the configuration information, the method further includes: The network device receives a first request message sent by the terminal, where the first request message is used to request a beam failure recovery.

In a possible design, when the terminal accesses one serving cell, that the network device measures an uplink signal based on the configuration information includes: The network device measures the uplink signal based on the M uplink signal resources.

In a possible design, the first request message includes first indication information, and the first indication information is used to indicate that a beam failure occurs in a serving cell.

In a possible design, the first request message includes second indication information, and the second indication information includes an identifier of at least one serving cell in which a beam failure occurs.

In a possible design, the first request message includes third indication information, and the third indication information is used to indicate that no new beam has been identified by the terminal.

In a possible design, when the terminal accesses a plurality of serving cells, at least one of the plurality of serving cells corresponds to at least one of the M uplink signal resources. That the network device measures an uplink signal based on the configuration information includes: For each of the plurality of serving cells, the network device measures the uplink signal based on at least one uplink signal resource corresponding to the serving cell.

In a possible design, when the terminal accesses a plurality of serving cells, at least one of the plurality of serving cells corresponds to at least one of the M uplink signal resources. That the network device measures an uplink signal based on the configuration information includes: For each of the at least one serving cell in which the beam failure occurs, the network device measures the uplink signal based on at least one uplink signal resource corresponding to the serving cell.

In a possible design, the first response message is used to indicate a new beam of the at least one serving cell in which the beam failure occurs.

In a possible design, the first response message is carried in signaling of a primary cell or a secondary cell in which no beam failure occurs.

In a possible design, a beam for transmitting the first response message is a new beam of the at least one serving cell in which the beam failure occurs.

In a possible design, the configuration information is further used to indicate N downlink signal resources, and N is a positive integer.

In a possible design, the configuration information is used to indicate a resource set. The resource set includes M uplink signal resource, or the resource set includes M uplink signal resources and N downlink signal resources.

In a possible design, the configuration information is used to indicate a first resource set and a second resource set. The first resource set includes M uplink signal resources, and the second resource set includes N downlink signal resources.

According to a third aspect, a communication apparatus is provided. The communication apparatus may be a terminal, or a chip or a system-on-a-chip in a terminal. The communication apparatus includes a receiving module and a sending module. The receiving module is configured to receive configuration information sent by a network device, where the configuration information is used to indicate M uplink signal resources, and M is a positive integer. The sending module is configured to send an uplink signal based on the configuration information. The receiving module is further configured to receive a first response message based on the uplink signal when a beam failure occurs, where the first response message is used to determine that a BFR succeeds.

In a possible design, the uplink signal resource is an SRS resource.

In a possible design, the SRS resource is an SRS resource used for antenna selection, an SRS resource used for physical uplink shared channel transmission, an SRS resource used for beam management, or an SRS resource used for new beam detection.

In a possible design, the sending module is further configured to: send a first request message before sending the uplink signal and when a beam failure occurs, where the first request message is used to request a beam failure recovery.

In a possible design, the sending module is further configured to: send a first request message after sending the uplink signal and when a beam failure occurs, where the first request message is used to request a beam failure recovery.

In a possible design, the sending module is further configured to send the uplink signal based on the M uplink signal resources when the terminal accesses one serving cell.

In a possible design, the first request message includes first indication information, and the first indication information is used to indicate that a beam failure occurs in a serving cell.

In a possible design, the first request message includes second indication information, and the second indication information is used to indicate at least one serving cell in which a beam failure occurs.

In a possible design, the first request message includes third indication information, and the third indication information is used to indicate that no new beam has been identified.

In a possible design, when the terminal accesses a plurality of serving cells, at least one of the plurality of serving cells corresponds to at least one of the M uplink signal resources. The sending module is further configured to: for each of the plurality of serving cells, send the uplink signal based on at least one uplink signal resource corresponding to the serving cell.

In a possible design, when the terminal accesses a plurality of serving cells, at least one of the plurality of serving cells corresponds to at least one of the M uplink signal resources. The sending module is further configured to: for each serving cell in which a beam failure occurs in the plurality of serving cells, send the uplink signal based on at least one uplink signal resource corresponding to the serving cell.

In a possible design, the first response message is used to indicate a new beam of the at least one serving cell in which the beam failure occurs.

In a possible design, the first response message is carried in signaling of a primary cell or a secondary cell in which no beam failure occurs.

In a possible design, a beam for transmitting the first response message is a new beam of the at least one serving cell in which the beam failure occurs.

In a possible design, the configuration information is further used to indicate N downlink signal resources, and N is a positive integer.

In a possible design, the configuration information is used to indicate a resource set. The resource set includes M uplink signal resource, or the resource set includes M uplink signal resources and N downlink signal resources.

In a possible design, the configuration information is used to indicate a first resource set and a second resource set. The first resource set includes M uplink signal resources, and the second resource set includes N downlink signal resources.

According to a fourth aspect, a communication apparatus is provided. The communication apparatus may be a network device, or a chip or a system-on-a-chip in a network device. The communication apparatus includes a sending module and a receiving module. The sending module is configured to send configuration information to a terminal, where the configuration information is used to indicate M uplink signal resources, and M is a positive integer. The receiving module is configured to measure an uplink signal based on the configuration information. The sending module is further configured to send a first response message to the terminal based on a measurement result of the uplink signal when a beam failure occurs, where the first response message is used to enable the terminal to determine that a BFR succeeds.

In a possible design, the uplink signal resource is an SRS resource.

In a possible design, the SRS resource is an SRS resource used for antenna selection, an SRS resource used for physical uplink shared channel transmission, an SRS resource used for beam management, or an SRS resource used for new beam detection.

In a possible design, the receiving module is further configured to receive a first request message sent by the terminal before measuring the uplink signal, where the first request message is used to request a beam failure recovery.

In a possible design, the receiving module is further configured to receive a first request message sent by the terminal after measuring the uplink signal, where the first request message is used to request a beam failure recovery.

In a possible design, the first request message includes first indication information, and the first indication information is used to indicate that a beam failure occurs in a serving cell.

In a possible design, the first request message includes second indication information, and the second indication information is used to indicate at least one serving cell in which a beam failure occurs.

In a possible design, the first request message includes third indication information, and the third indication information is used to indicate that no new beam has been identified by the terminal.

In a possible design, when the terminal accesses a plurality of serving cells, at least one of the plurality of serving cells corresponds to at least one of the M uplink signal resources. The receiving module is further configured to: for each of the plurality of serving cells, measure the uplink signal based on at least one uplink signal resource corresponding to the serving cell.

In a possible design, when the terminal accesses a plurality of serving cells, at least one of the plurality of serving cells corresponds to at least one of the M uplink signal resources. The receiving module is further configured to: for each of the at least one serving cell in which the beam failure occurs, measure the uplink signal based on at least one uplink signal resource corresponding to the serving cell.

In a possible design, the first response message is used to indicate a new beam of the at least one serving cell in which the beam failure occurs.

In a possible design, the first response message is carried in signaling of a primary cell or a secondary cell in which no beam failure occurs.

In a possible design, a beam for transmitting the first response message is a new beam of the at least one serving cell in which the beam failure occurs.

In a possible design, the configuration information is further used to indicate N downlink signal resources, and N is a positive integer.

In a possible design, the configuration information is used to indicate a resource set. The resource set includes M uplink signal resource, or the resource set includes M uplink signal resources and N downlink signal resources.

In a possible design, the configuration information is used to indicate a first resource set and a second resource set. The first resource set includes M uplink signal resources, and the second resource set includes N downlink signal resources.

According to a fifth aspect, a communication apparatus is provided. The communication apparatus includes a processor. The processor may be configured to execute instructions in a memory to implement the beam failure recovery method according to any design of the first aspect or the second aspect. Optionally, the communication apparatus further includes the memory, and the processor is coupled to the memory. Optionally, the communication apparatus further includes a communication interface, and the processor is coupled to the communication interface.

In an implementation, the communication interface may be a transceiver, a transceiver circuit, an input/output interface, an input/output circuit, or the like.

In another implementation, when the communication apparatus is a chip or a chip system, the processor may alternatively be a processing circuit or a logic circuit; and the communication interface may be an input/output interface, an interface circuit, an output circuit, an input circuit, a pin, a related circuit, or the like on the chip or the chip system.

According to a sixth aspect, a communication apparatus is provided. The communication apparatus includes a processor and a memory. The memory is coupled to the processor. The memory stores instructions. When the processor executes the instructions, the communication apparatus is enabled to implement the beam failure recovery method according to any design of the first aspect or the second aspect. Optionally, the communication apparatus further includes a communication interface, and the communication interface is used by the communication apparatus to communicate with another device.

In an implementation, the communication interface may be a transceiver, a transceiver circuit, an input/output interface, an input/output circuit, or the like.

In an implementation, when the communication apparatus is a chip or a chip system, the processor may alternatively be a processing circuit or a logic circuit; the memory may be a storage circuit; and the communication interface may be an input/output interface, an interface circuit, an output circuit, an input circuit, a pin, a related circuit, or the like on the chip or the chip system.

According to a seventh aspect, a communication apparatus is provided. The communication apparatus includes a processor and a communication interface. The processor is configured to execute a computer program, so that the communication apparatus implements the beam failure recovery method according to any design of the first aspect or the second aspect.

In an implementation, the communication interface may be a transceiver, a transceiver circuit, an input/output interface, an input/output circuit, or the like.

In another implementation, when the communication apparatus is a chip or a chip system, the processor may alternatively be a processing circuit or a logic circuit; and the communication interface may be an input/output interface, an interface circuit, an output circuit, an input circuit, a pin, a related circuit, or the like on the chip or the chip system.

According to an eighth aspect, a computer-readable storage medium is provided. The computer-readable storage medium stores instructions. When the instructions are run on a computer, the computer is enabled to perform the beam failure recovery method according to any design of the first aspect or the second aspect.

According to a ninth aspect, a computer program product is provided. The computer program product includes instructions. When the computer program product runs on a computer, the computer is enabled to perform the beam failure recovery method according to any design of the first aspect or the second aspect.

According to a tenth aspect, a chip or a chip system is provided. The chip includes a processor. When the processor executes instructions, the processor is configured to perform the beam failure recovery method according to any design of the first aspect or the second aspect. The instructions may be from a memory inside the chip, or may be from a memory outside the chip. Optionally, the chip further includes an input/output circuit that may be used as a communication interface.

According to an eleventh aspect, a communication system is provided. The communication system includes a terminal and a network device. The terminal is configured to perform the beam failure recovery method according to any design of the first aspect, and the network device is configured to perform the beam failure recovery method according to any design of the second aspect.

For technical effects brought by any design of the third aspect to the eleventh aspect, refer to technical effects brought by the foregoing corresponding methods.

DESCRIPTION OF EMBODIMENTS

Figure 1:
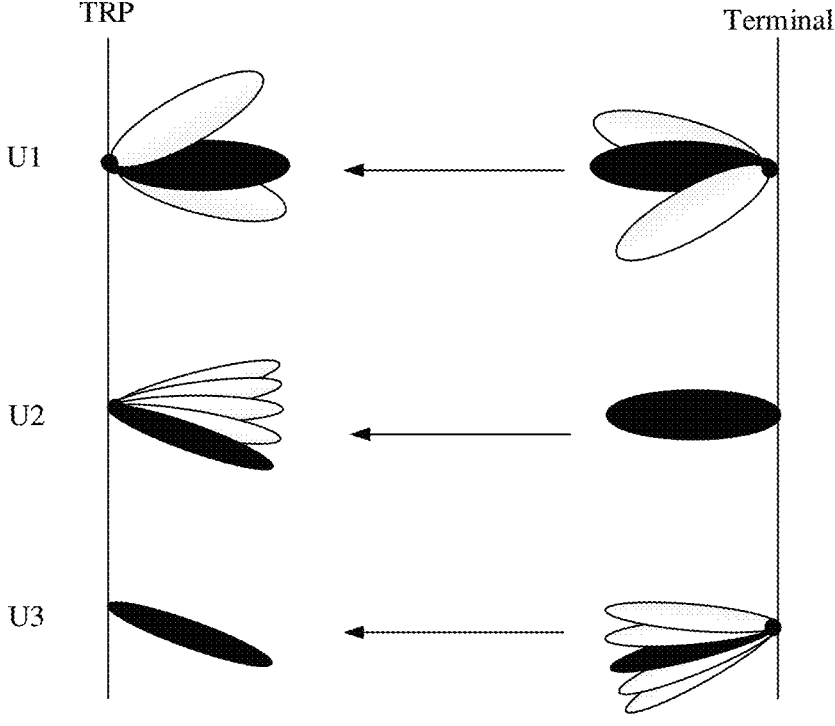
FIG. 1 is a schematic diagram of uplink beam training.

In the descriptions of this application, unless otherwise specified, "I" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference either.

It should be noted that, in this application, the word such as "exemplary" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

In descriptions of this application, an "indication" may include a direct indication and an indirect indication, or may include an explicit indication and an implicit indication. Information indicated by a piece of information (such as first indication information or second indication information described below) is referred to as to-be-indicated information. In a specific implementation process, there are a plurality of manners of indicating the to-be-indicated information. For example, the to-be-indicated information may be directly indicated, where the to-be-indicated information itself, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

To facilitate understanding of technical solutions in this application, the following first briefly describes terms in this application.

1. Beam

The beam in an NR protocol may be embodied as a spatial domain filter (spatial domain filter) that is also referred to as a spatial filter (spatial filter) or a spatial parameter (spatial parameter). A beam used to send a signal may be referred to as a transmit beam (transmission beam, Tx beam), or may be referred to as a spatial domain transmit filter (spatial domain transmission filter) or a spatial transmit parameter (spatial transmission parameter). A beam used to receive a signal may be referred to as a receive beam (reception beam, Rx beam), or may be referred to as a spatial domain receive filter (spatial domain receive filter) or a spatial receive parameter (spatial RX parameter).

In a 5G millimeter wave communication system, data is transmitted in a beam pair manner. It may be understood that the beam pair may include a transmit beam of a transmit end and a receive beam of a receive end. The transmit end sends data by using the transmit beam, and the receive end receives data by using the corresponding receive beam.

The beam pair may also be referred to as an uplink beam or a downlink beam. The uplink beam is configured to carry information sent by a terminal to a network device, and the uplink beam includes a transmit beam of the terminal and a receive beam of the network device. The downlink beam is configured to carry information sent by the network device to the terminal, and the downlink beam includes a receive beam of the terminal and a transmit beam of the network device.

It should be understood that the foregoing listed representation of the beam in the NR protocol is merely an example, and shall not constitute any limitation on this application. This application does not exclude a possibility of defining another term in a future protocol to represent a same or similar meaning.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like. Different beams may be considered as different resources. The communication apparatus may send same or different information by using different beams.

In the embodiments of this application, one beam corresponds to one resource. Therefore, a beam corresponding to a resource may be uniquely identified by using an index of the resource.

2. Beam Reciprocity

The beam reciprocity may be understood as a correlation between a receive beam and a transmit beam (Tx/Rx beam correspondence).

The beam reciprocity means that a base station can determine, based on measurement performed by a terminal on downlinks of one or more transmit beams of the base station, a receive beam used by the base station for an uplink; or a base station can determine, based on measurement performed by the base station on uplinks of one or more receive beams of the base station, a transmit beam used by the base station for a downlink; or a terminal can determine, based on measurement performed by the terminal on downlinks of one or more receive beams of the terminal, a transmit beam used by the terminal for an uplink; or a terminal can determine, based on an indication of a base station, a receive beam used for a downlink, where the indication of the base station is based on measurement performed by the base station on uplinks of one or more transmit beams of the terminal.

For a specific definition of the beam reciprocity, refer to 38.912 protocol of the third generation partnership project (3rd generation partnership project, 3GPP).

3. Resource

The resource is a data structure that includes a plurality of sub-parameters for encapsulating related information.

For example, an uplink signal resource is used as an example. The uplink signal resource may include at least one of the following parameters: a type of an uplink signal, a resource element (resource element, RE) carrying the uplink signal, a sending time and period of the uplink signal, a quantity of ports used to send the uplink signal, and the like. Each uplink signal resource has a unique index to identify a resource of the uplink signal. It may be understood that an index of the uplink signal resource may have another name, for example, an uplink signal resource identifier. This is not limited in the embodiments of this application.

4. Uplink Beam Training

The uplink beam training is used to determine a transmit beam of a terminal and a receive beam of a transmission reception point (transmission reception point, TRP).

As shown in FIG. 1, the uplink beam training includes the following steps:

U1: Perform TRP detection on different transmit beams of a terminal, and select a transmit beam of the terminal or a receive beam of a TRP. U1 is not a mandatory step.

U2: Perform TRP detection on different receive beams of the TRP, and change or select a receive beam of the TRP to refine the receive beam of the TRP.

U3: Perform TRP detection on a same receive beam of the TRP, and change or select a transmit beam of the terminal to refine the transmit beam of the terminal.

For specific implementations of the foregoing steps, refer to a conventional technology. This is not limited in the embodiments of this application.

5. Random Access Procedure (Random Access Procedure)

The random access is used to establish an uplink between a terminal and a network device. The random access procedure is used in a plurality of events, such as a cell handover procedure and an RRC connection re-establishment procedure.

For example, a contention-based random access procedure includes the following four steps:

Step 1: The terminal sends a preamble to the network device. It should be noted that the preamble is carried on a physical random access channel (physical random access channel, PRACH).

Step 2: The network device sends a random access response to the terminal.

Step 3: The terminal sends a message (message, Msg) 3 to the network device.

Step 4: The network device sends an Msg 4 to the terminal.

For specific descriptions of the messages sent in the foregoing steps, refer to a conventional technology. Details are not described in the embodiments of this application.

For example, a non-contention-based random access procedure includes the following two steps:

Step 1: The terminal sends a preamble to the network device.

Step 2: The network device sends a random access response to the terminal.

6. Transmission Configuration Indication (Transmission Configuration Indication, TCI) State (State)

The TCI state is used to indicate a quasi co-location (Quasi Co-Location, QCL) relationship between different physical signals and/or physical channels. For example, the TCI state may be used to indicate a QCL relationship between a CSI-RS and a demodulation reference signal (demodulation reference signal, DMRS).

The QCL relationship is used to indicate that a plurality of antenna ports have one or more same or similar communication features. For example, if two antenna ports have a quasi co-location relationship, a large-scale channel feature of transmitting one signal by one antenna port may be deduced from a large-scale channel feature of transmitting one signal by the other antenna port. For two antenna ports having a QCL relationship, signals corresponding to the two antenna ports have a same parameter; a parameter of one antenna port may be used to determine a parameter of the other antenna port having a QCL relationship with the antenna port; or a parameter difference between the two antenna ports is less than a preset threshold.

For example, Table 1 shows four QCL types (type).

TABLE 1

| Type | Feature | Function |
|---|---|---|
| QCL type A | Doppler shift (Doppler shift), Doppler spread (Doppler spread), average channel delay (Average delay), and delay spread (Delay spread) | Obtaining channel estimation information |
| QCL type B | Doppler shift and Doppler spread | Obtaining channel estimation information |

TABLE 1-continued

| Type | Feature | Function |
|---|---|---|
| QCL type C | Average delay and Doppler shift | Obtaining measurement information such as an RSRP |
| QCL type D | Spatial receiving parameter (Spatial Rx parameter) | Assisting beamforming of a terminal |

The foregoing describes terms used in the instances of this application, and details are not described in the following again.

In a 5G millimeter wave communication system, because channel fluctuation is severe, a beam pair failure between a base station and a terminal may occur. A BFR may be used to help the base station or the terminal adjust a currently failed beam pair to an available beam pair based on a beam measurement result, to avoid frequent radio link failures caused by beam pair failures.

Figure 2:
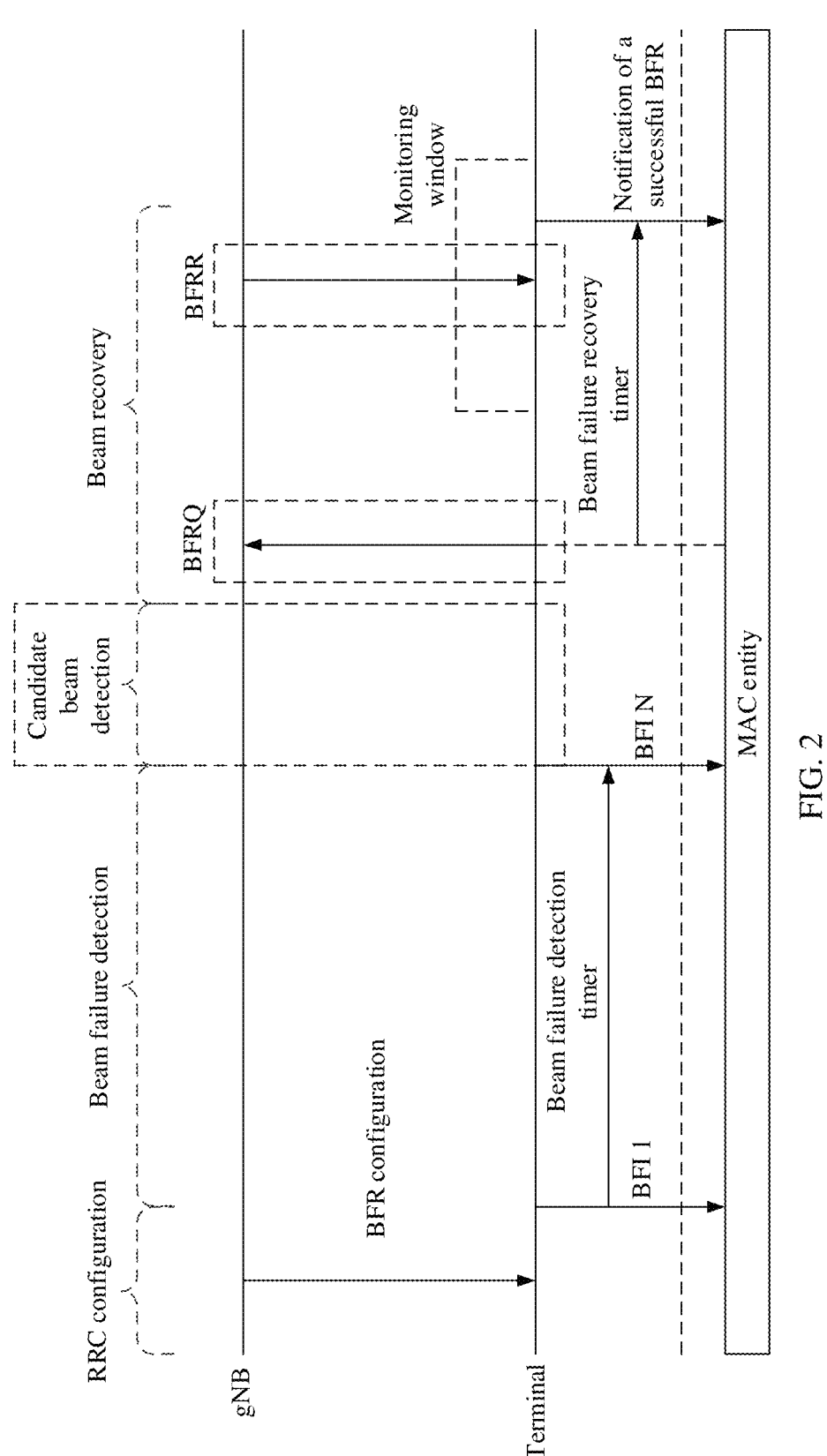
FIG. 2 is a schematic diagram of a BFR.

As shown in FIG. 2, a BFR of a single cell mainly includes the following steps:

A base station configures a CSI-RS periodic resource index with a set $\bar{q}_0$ for a terminal by using a higher-layer parameter failureDetectionResourcesToAddModList; and the base station configures a CSI-RS periodic resource index/synchronization signal block (synchronization signal block, SSB) index with a set $\bar{q}_1$ for the terminal by using a higher-layer parameter candidateBeamRSList. It should be noted that an SSB may also be referred to as a synchronization signal/physical broadcast channel block (synchronization signal/physical broadcast channel block, SS/PBCH block).

If failureDetectionResourcesToAddModList is not configured for the terminal, the terminal obtains, by using activated TCI state information of a control resource set (control resource set, CORESET) of a corresponding monitored physical downlink control channel (physical downlink control channel, PDCCH), the set $\bar{q}_0$ including a periodic CSI-RS resource. A TCI state of a reference signal (reference signal, RS) expected to be obtained by the terminal has QCL-Type D. The terminal expects the RS of the set $\bar{q}_0$ to be single-port.

A physical layer of the terminal estimates link quality (radio link quality) based on the RS in the set $\bar{q}_0$. The terminal expects that the RS in the set $\bar{q}_0$ on which the estimation is based is periodic and has a QCL-Type D relationship with the DMRS of the corresponding monitored PDCCH. When the link quality estimated based on all RSs is poorer than a threshold $Q_{out,LR}$, the physical layer of the terminal sends a beam failure indication (beam failure indication, BFI) to a MAC layer. The threshold $Q_{out,LR}$ is a default value of a higher-layer parameter rlmInSyncOutOfSyncThreshold. For a period of reporting the BFI by the physical layer, refer to a conventional technology.

When the physical layer of the terminal receives Beam-Failure-Instance-MaxCount consecutive BFIs, it is considered that a beam failure occurs between the terminal and the base station. When a beam failure occurs, the physical layer of the terminal selects, from the set $\bar{q}_1$, an RS with an L1-RSRP measurement value greater than or equal to a threshold $Q_{in,LR}$ and reports the RS to the MAC layer of the terminal. The threshold $Q_{in,LR}$ is configured by using a higher-layer parameter rsrp-ThresholdSSB. Specifically, for an SSB resource in the set $\bar{q}_1$, the threshold $Q_{in,LR}$ directly uses the higher-layer parameter rsrp-ThresholdSSB. For a CSI-RS resource in the set $q_1$, the threshold $Q_{in,LR}$ uses a product of rsrp-ThresholdSSB and powerControlOffsetSS.

When the terminal determines the beam failure and determines at least one candidate beam, the terminal may send a beam failure recovery request (beam failure recovery request, BFRQ) to the base station, where the BFRQ includes a beam failure indication and information about the candidate beam. The BFRQ may be carried on a PRACH configured by a higher-layer parameter PRACH-ResourceDedicatedBFR.

When the terminal transmits the BFRQ in a slot n, the terminal is to listen, from a slot n+4 in a monitoring window configured by a higher-layer parameter BeamFailureRecoveryConfig, to a PDCCH scrambled by cyclic redundancy check (cyclic redundancy check, CRC) initialized by a cell-radio network temporary identifier (cell-radio network temporary identifier, C-RNTI) or a modulation and coding scheme (modulation and coding scheme, MCS)-C-RNTI. Search space of the PDCCH is configured by a higher-layer parameter recoverySearchSpaceID. The PDCCH is configured to carry a beam failure recovery response (beam failure recovery response, BFRR).

It should be noted that a CORESET carrying the PDCCH has a QCL relationship with a periodic CSI-RS or an SSB that is selected from a set $\bar{q}_1$ and that has an index $q_{new}$. $q_{new}$ is determined by the MAC layer of the terminal.

When the terminal correctly parses the PDCCH out of the search space configured by the higher-layer parameter recoverySearchSpaceID, it is considered that the BFR procedure succeeds. The physical layer of the terminal may send notification of a successful BFR (notification of a successful BFR) to the MAC layer.

As can be learned from the foregoing description of the BFR procedure, in the BFR procedure, the new beam candidate set configured by the base station for the terminal includes a CSI-RS resource or an SSB resource. The new beam candidate set is the set $q_1$ in the foregoing description. In addition, in the BFR procedure, the terminal needs to determine beam quality corresponding to the CSI-RS resource/SSB resource in the new beam candidate set. This increases implementation complexity of the terminal in the BFR procedure.

In addition, in a scenario in which the terminal accesses a plurality of serving cells, the BFR procedure is applicable only to a primary cell. The industry has not provided a specific technical solution for a BFR procedure of a secondary cell.

To reduce the implementation complexity of the terminal in the BFR procedure, this application provides a beam failure recovery method. For a specific description of the method, refer to the following description. In addition, in the scenario in which the terminal accesses the plurality of serving cells, the beam failure recovery method provided in this application is not only applicable to the primary cell, but also applicable to a cell other than the primary cell, for example, the secondary cell or a primary secondary cell.

The technical solutions provided in the embodiments of this application may be applied to various communication systems that use a beamforming technology, for example, a new radio (new radio, NR) communication system that uses a fifth generation (5th generation, 5G) communication technology, a future evolved system, and a multi-communication fusion system. The technical solutions provided in this application may be applied to a plurality of application scenarios, for example, machine to machine (machine to machine, M2M), macro-micro communication, enhanced mobile broadband (enhanced mobile broadband, eMBB), ultra-reliable low-latency communication (ultra reliable & low latency communication, uRLLC), and massive machine type communication (massive machine type communication, mMTC). The scenarios may include but are not limited to a scenario of communication between terminals, a scenario of communication between network devices, a scenario of communication between a network device and a terminal, and the like. The following provides descriptions by using an example in which the technical solutions are applied to a scenario of communication between a network device and a terminal.

Figure 3:
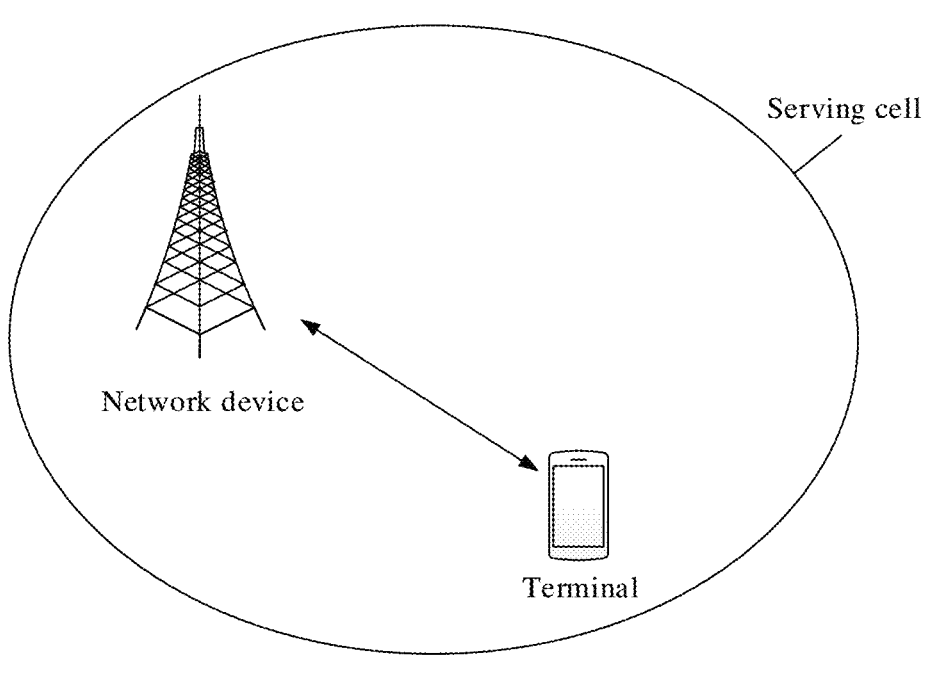
FIG. 3 is a schematic diagram of an architecture of a communication system according to an embodiment of this application.

FIG. 3 is a schematic diagram of an architecture of a communication system according to an embodiment of this application. As shown in FIG. 3, a terminal may access a serving cell to establish a communication link to a network device.

Figure 4:
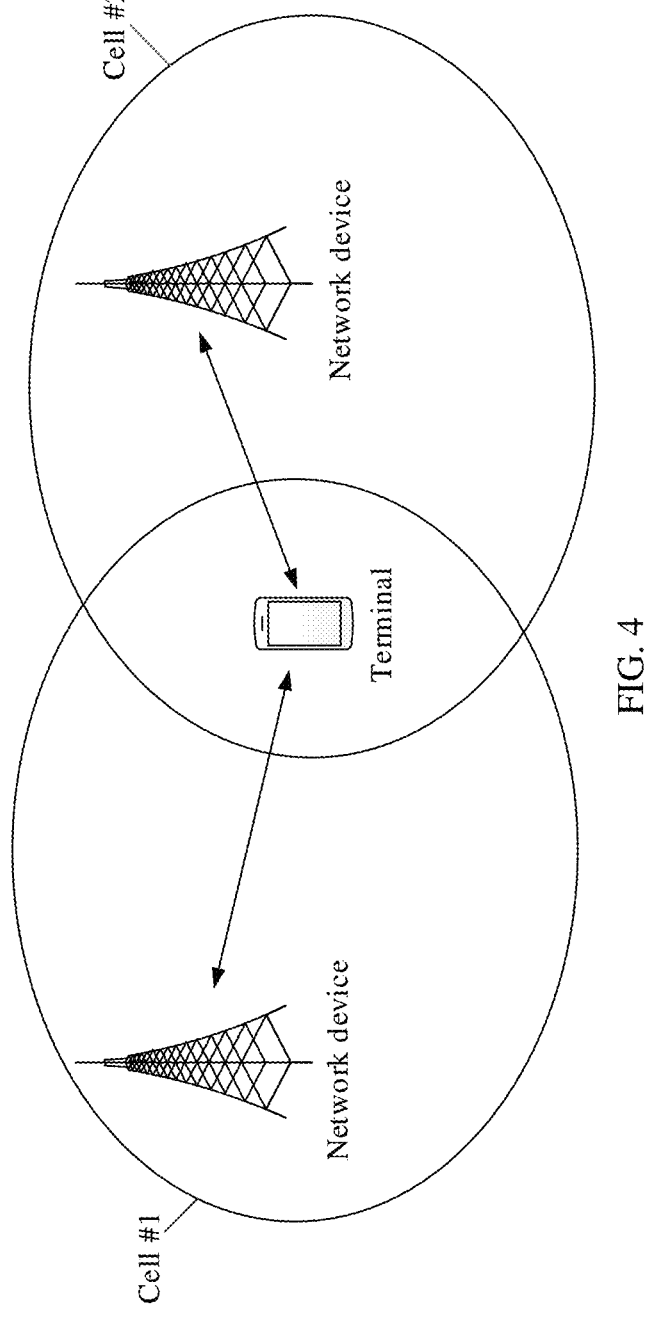
FIG. 4 is a schematic diagram of an architecture of another communication system according to an embodiment of this application.

FIG. 4 is a schematic diagram of an architecture of a communication system according to an embodiment of this application. As shown in FIG. 4, a terminal may simultaneously access a plurality of serving cells. For example, the terminal simultaneously accesses a cell #1 and a cell #2. It may be understood that the plurality of serving cells accessed by the terminal may belong to a same network device or may belong to different network devices. This embodiment of this application is not limited thereto.

It should be noted that the scenario shown in FIG. 4 in which the plurality of serving cells provide services for the terminal includes but is not limited to: a carrier aggregation (carrier aggregation, CA) scenario, a multi-TRP scenario, a dual connectivity (dual connectivity, DC) scenario, a coordinated multiple points (coordinated multiple points, CoMP) scenario, and the like. The scenarios are not listed one by one herein.

In the CA scenario, the plurality of serving cells accessed by the terminal may include a primary cell (primary cell, PCell) and a secondary cell (secondary cell, SCell). The PCell is a cell to which the terminal establishes an initial connection, a cell to which the terminal re-establishes an RRC connection, or a primary cell specified in a switching procedure. The SCell may be added during RRC re-configuration, and is configured to provide an extra radio resource. It should be noted that when a CA technology is used, one serving cell corresponds to one component carrier (component carrier, CC). For example, a component carrier corresponding to the PCell may be referred to as a primary component carrier (primary component carrier, PCC). A component carrier corresponding to the SCell is referred to as a secondary component carrier (secondary component carrier, SCC). In the CA scenario, the terminal simultaneously accesses the plurality of serving cells. This is equivalent to that the terminal may communicate with the network device simultaneously on a plurality of CCs to support a larger transmission bandwidth.

In the DC scenario, the plurality of serving cells accessed by the terminal may include a PCell, an SCell, or a primary secondary cell (primary second cell, PScell). For definitions of the PCell and the SCell, refer to the foregoing descriptions. Details are not described herein again. The PSCell may also be referred to as a primary secondary cell group cell (primary secondary cell group cell). In the DC scenario, when the terminal performs re-configuration in a synchronization procedure, the PSCell is a cell in a secondary cell group (secondary cell group) randomly accessed by the terminal. The secondary cell group is a subset including a PSCell and N SCells for a terminal configured with a dual connectivity, where N is a natural number.

It should be noted that FIG. 3 and FIG. 4 are merely schematic diagrams, and constitute no limitation on an applicable scenario of the technical solution provided in this application.

The network device may be a base station, a base station controller, or the like in wireless communication. The base station may include various types of base stations, such as a micro base station (also referred to as a small cell), a macro base station, a relay station, and an access point. This is not specifically limited in the embodiments of this application. In the embodiments of this application, the base station may be a base transceiver station (base transceiver station, BTS) in a global system for mobile communications (global system for mobile communication, GSM) or code division multiple access (code division multiple access, CDMA), a NodeB (node B) in wideband code division multiple access (wideband code division multiple access, WCDMA), an evolved NodeB (evolutional node B, eNB or e-NodeB) in long term evolution (long term evolution, LTE), an eNB in the internet of things (internet of things, IoT) or the narrowband internet of things (narrow band-internet of things, NB-IoT), or a base station in a future 5G mobile communication network or a future evolved public land mobile network (public land mobile network, PLMN). This is not limited in the embodiments of this application. In the embodiments of this application, an apparatus configured to implement a function of the network device may be a network device, or may be an apparatus, for example, a chip system, that can support the network device in implementing the function. In the embodiments of this application, an example in which the apparatus configured to implement the function of the network device is the network device is used to describe the technical solutions provided in the embodiments of this application.

The network device described in this application, for example, the base station, usually includes a baseband unit (baseband unit, BBU), a remote radio unit (remote radio unit, RRU), an antenna, and a feeder used to connect the RRU and the antenna. The BBU is responsible for signal modulation. The RRU is responsible for radio frequency processing. The antenna is responsible for conversion between a pilot wave on a cable and a space wave in the air. On the one hand, a distributed base station greatly shortens a length of the feeder between the RRU and the antenna, to reduce a signal loss, and reduce costs of the feeder. On the other hand, the RRU and the antenna are relatively small and can be installed anywhere, making network planning more flexible. The RRU may be remotely placed. In addition to that, all BBUs may be centralized and placed in a central office (Central Office, CO). In this centralized manner, a quantity of base station equipment rooms can be greatly reduced, energy consumption of auxiliary devices, especially air conditioners, can be reduced, and carbon emission can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (centralized unit, CU) and a distributed unit (Distributed Unit, DU). The base station may further include an active antenna unit (active antenna unit, AAU). The CU implements some functions of the base station, and the DU implements some functions of the base station. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that the network device may be a device including one or more of a CU node, a DU node, and an AAU node. In addition, the CU may be classified into a network device in a RAN, or the CU may be classified into a network device in a core network (core network, CN). This is not limited herein.

The terminal is a device that has a wireless transceiver function. The terminal may be deployed on land, including an indoor or outdoor device, a handheld device, or a vehicle-mounted device, or may be deployed on a water surface (for example, on a ship), or may be deployed in air (for example, on an aircraft, a balloon, or a satellite). The terminal device may be user equipment (user equipment, UE). The UE includes a handheld device, a vehicle-mounted device, a wearable device, or a computing device that has a wireless communication function. For example, the UE may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In the embodiments of this application, an apparatus configured to implement a function of the terminal may be a terminal, or may be an apparatus, for example, a chip system, that can support the terminal in implementing the function. In the embodiments of this application, the chip system may include a chip, or may include a chip and another discrete component. In the embodiments of this application, an example in which the apparatus configured to implement the function of the terminal is the terminal is used to describe the technical solutions provided in the embodiments of this application.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 5:
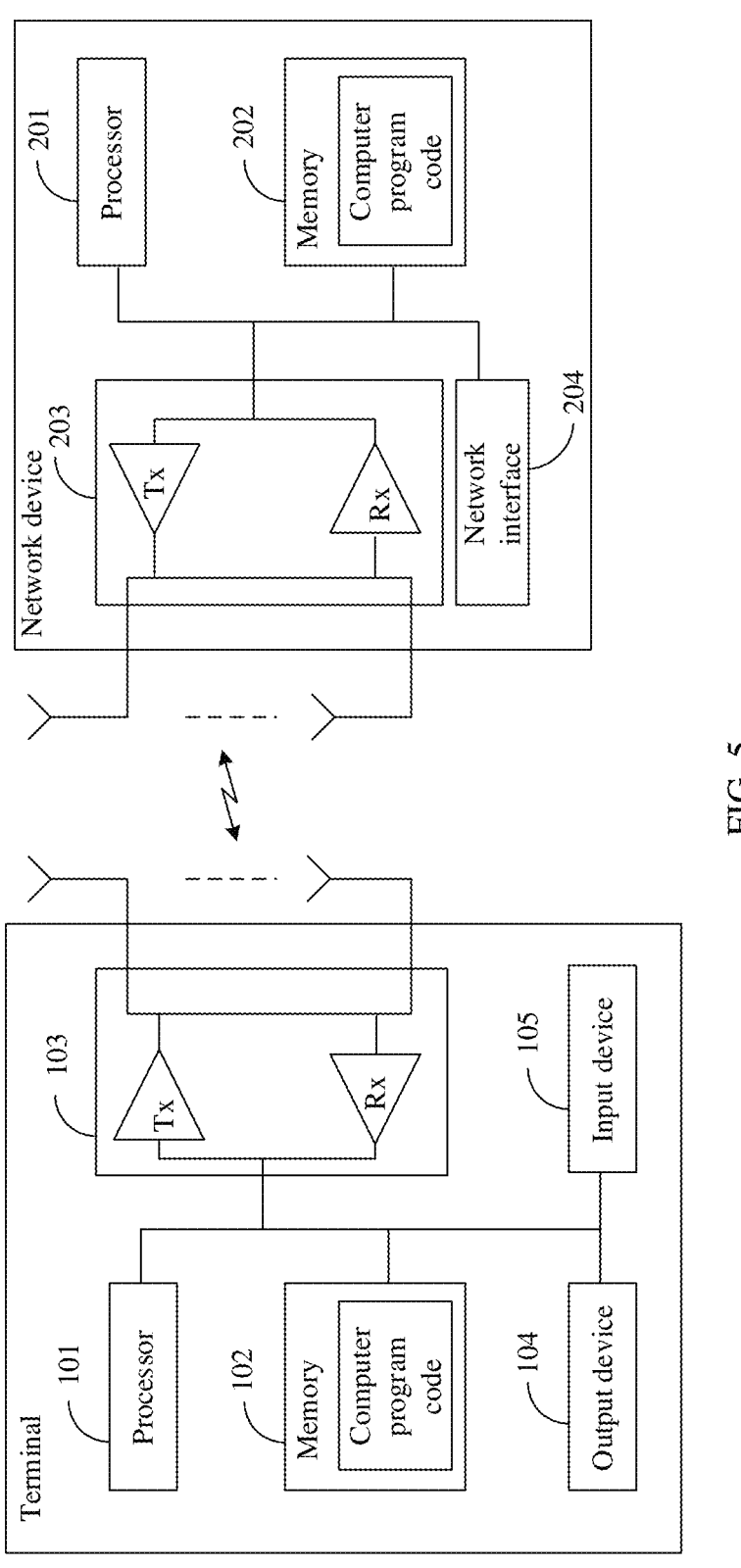
FIG. 5 is a schematic diagram of hardware structures of a terminal and a network device according to an embodiment of this application.

FIG. 5 is a schematic diagram of hardware structures of a network device and a terminal according to an embodiment of this application.

The terminal includes at least one processor 101 and at least one transceiver 103. Optionally, the terminal may further include an output device 104, an input device 105, and at least one memory 102.

The processor 101, the memory 102, and the transceiver 103 are connected through a bus. The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 101 may further include a plurality of CPUs, and the processor 101 may be a single-core (single-CPU) processor or a multi-core (multi-CPU) processor. The processor herein may be one or more devices, circuits, or processing cores configured to process data (for example, computer program instructions).

The memory 102 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. This is not limited in this embodiment of this application. The memory 102 may exist independently, and is connected to the processor 101 through the bus. Alternatively, the memory 102 may be integrated with the processor 101. The memory 102 is configured to store application program code for performing the solutions in this application, and the processor 101 controls the execution. The processor 101 is configured to execute the computer program code stored in the memory 102, to implement a method provided in the embodiments of this application.

The transceiver 103 may be any apparatus such as a transceiver, and is configured to communicate with another device or a communication network such as the Ethernet, a radio access network (radio access network, RAN), or a wireless local area network (wireless local area networks, WLAN). The transceiver 103 includes a transmitter Tx and a receiver Rx.

The output device 104 communicates with the processor 101, and may display information in a plurality of manners. For example, the output device 104 may be a liquid crystal display (liquid crystal display, LCD), a light emitting diode (light emitting diode, LED) display device, a cathode ray tube (cathode ray tube, CRT) display device, or a projector (projector). The input device 105 communicates with the processor 101, and may receive an input of a user in a plurality of manners. For example, the input device 105 may be a mouse, a keyboard, a touchscreen device, a sensor device, or the like.

The network device includes at least one processor 201, at least one memory 202, at least one transceiver 203, and at least one network interface 204. The processor 201, the memory 202, the transceiver 203, and the network interface 204 are connected through a bus. The network interface 204 is configured to connect to a core network device through a link (for example, an S1 interface), or connect to a network interface of another network device through a wired or wireless link (for example, an X2 interface) (not shown in the figure). This is not specifically limited in this embodiment of this application. In addition, for related descriptions of the processor 201, the memory 202, and the transceiver 203, refer to the descriptions of the processor 101, the memory 102, and the transceiver 103 in the terminal. Details are not described herein again.

The following describes the technical solutions in this application in detail with reference to the accompanying drawings of the specification.

Figure 6:
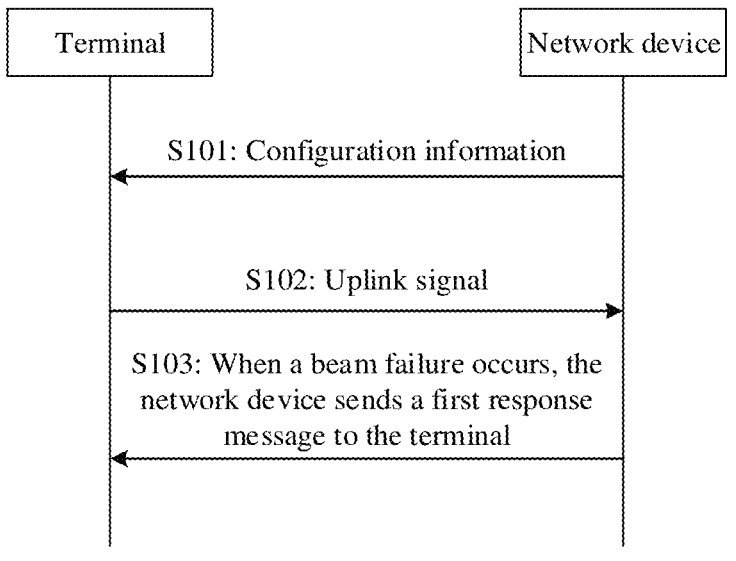
FIG. 6 is a flowchart of a beam failure recovery method according to an embodiment of this application.

FIG. 6 shows a beam failure recovery method according to an embodiment of this application. The method includes the following steps.

S101: A network device sends configuration information to a terminal, and the terminal receives the configuration information sent by the network device.

The configuration information is used to indicate M uplink signal resources of the terminal, and M is a positive integer. The uplink signal resources indicated by the configuration information may be used for new beam detection. The new beam detection may also be referred to as new beam identification or candidate beam detection. This embodiment of this application is not limited thereto.

In this embodiment of this application, the uplink signal resources include but are not limited to an SRS resource. The SRS resource may be periodic, semi-consistent, or non-periodic.

Optionally, the SRS resource indicated by the configuration information may be an SRS resource reused in a current standard. That is, the SRS resource indicated by the configuration information may be an SRS resource used for antenna selection, an SRS resource used for physical uplink shared channel (physical uplink shared channel, PUSCH) transmission, or an SRS resource used for beam management. The SRS resource used for PUSCH transmission may be divided into two categories: an SRS resource used for a codebook (codebook) and an SRS resource used for a non-codebook.

Optionally, the SRS indicated by the configuration information may be a newly defined SRS resource dedicated to new beam detection.

It should be noted that the indication of the configuration information to the M uplink signal resources of the terminal includes the following two implementations:

Implementation 1: The configuration information explicitly indicates the M uplink signal resources of the terminal.

For example, the configuration information includes indexes of the M uplink signal resources.

Implementation 2: The configuration information implicitly indicates the M uplink signal resources of the terminal.

(1) The configuration information is used to indicate a resource set. The resource set includes M uplink signal resources.

Optionally, that the configuration information is used to indicate a resource set may be implemented as: The configuration information includes an index of the resource set.

Optionally, the network device has pre-configured a resource set for the terminal, and the resource set is inactive. In this case, that the configuration information is used to indicate a resource set may be implemented as: The configuration information includes indication information corresponding to the resource set, and the indication information corresponding to the resource set is used to indicate whether to activate the resource set. Optionally, the indication information may be implemented by using one or more bits. For example, the indication information is implemented by using one bit. A value of the indication information being "1" is used to indicate to activate the resource set, and a value of the indication information being "0" is used to indicate not to activate the resource set. It may be understood that if the resource set is activated, the terminal may send an uplink signal resource based on the uplink signal resource included in the resource set. Correspondingly, the network device may measure an uplink signal based on the uplink signal resource included in the resource set.

(2) The configuration information is used to indicate L resource sets, where L is a positive integer greater than or equal to 2. Each of the L resource sets may include some of the M uplink signal resources. In other words, the M uplink signal resources separately belong to the L resource sets. Optionally, each of the L resource sets includes different uplink signal resources.

Optionally, that the configuration information is used to indicate L resource sets may be implemented as: The configuration information includes an index of each of the L resource sets.

Optionally, the network device pre-configures P resource sets, all the P resource sets are inactive, and P is a positive integer greater than or equal to L. For example, that the configuration information is used to indicate L resource sets may be implemented as: The configuration information includes a bitmap, the bitmap includes at least P bits, the P bits are in a one-to-one correspondence with P resource sets, and one bit is used to indicate whether to activate a corresponding resource set. For example, a value of the bit being "1" is used to indicate to activate the corresponding resource set, and a value of the bit being "0" is used to indicate not to activate the corresponding resource set. It may be understood that if the L resource sets are activated, the terminal may send an uplink signal based on the uplink signal resources included in the L resource sets. Correspondingly, the network device may measure an uplink signal based on the uplink signal resources included in the L resource sets.

Based on the implementation 2, one resource set may correspond to one or more serving cells. This is not limited in this embodiment of this application.

The foregoing resource set may have another name, such as a new beam identification set, a candidate beam detection set, or a new beam detection set. This embodiment of this application is not limited thereto.

It may be understood that the configuration information may use different implementations in different application scenarios. The following describes the configuration information in detail for different application scenarios.

Scenario 1: The terminal accesses only one serving cell.

Based on the scenario 1, all the M uplink signal resources indicated by the configuration information are uplink signal resources corresponding to the serving cell accessed by the terminal. In this case, the configuration information may indicate only one resource set, and the resource set includes M uplink signal resources.

Scenario 2: The terminal accesses a plurality of serving cells.

Based on the scenario 2, at least one of the plurality of serving cells corresponds to at least one of the M uplink signal resources. For example, the terminal accesses a cell #1, a cell #2, a cell #3, and a cell #4; and the configuration information is used to indicate an uplink signal resource #1, an uplink signal resource #2, an uplink signal resource #3, an uplink signal resource #4, and an uplink signal resource #5. The cell #1 may correspond to the uplink signal resource #1 and the uplink signal resource #3. The cell #2 may correspond to the uplink signal resource #2. The cell #3 may correspond to the uplink signal resource #4 and the uplink signal resource #5. The cell #4 may not correspond to any uplink signal resource indicated by the configuration information.

In this embodiment of this application, the uplink signal resources may be in a one-to-one, one-to-many, or many-to-one correspondence with the serving cells. This is not limited.

Optionally, a correspondence between an uplink signal resource and a serving cell may be configured explicitly. For example, configuration information of an uplink signal resource includes an index of a serving cell corresponding to the uplink signal resource. Therefore, a communication apparatus can determine, based on the index of the serving cell included in the configuration information of the uplink signal resource, the serving cell corresponding to the uplink signal resource.

Optionally, a correspondence between an uplink signal resource and a serving cell may be configured implicitly. For example, configuration information of a resource set includes an index of a serving cell. Therefore, a communication apparatus can determine, based on the index of the serving cell included in the configuration information of the resource set, the serving cell corresponding to all uplink signal resources in the resource set. For example, the configuration information of the resource set includes an index of a cell #1 and an index of a cell #2, the resource set includes an uplink signal resource #1 and an uplink signal resource #2. Therefore, the cell #1 corresponds to the uplink signal resource #1 and the uplink signal resource #2, and the cell #2 corresponds to the uplink signal resource #1 and the uplink signal resource #2.

For example, the configuration information may include only one resource set, and the resource set includes M uplink signal resources. The resource set corresponds to each of the plurality of serving cells accessed by the terminal, so that each of the plurality of serving cells corresponds to the M uplink signal resources.

For example, the configuration information may indicate a resource set corresponding to at least one of the plurality of serving cells, and the resource set corresponding to the serving cell includes at least one of the M uplink signal resources. For example, the terminal accesses a cell #1, a cell #2, and a cell #3, and the configuration information may indicate a resource set #1 corresponding to the cell #1 and a resource set #2 corresponding to the cell #2. The resource set #1 includes an uplink signal resource #1 and an uplink signal resource #2, and the resource set #2 includes an uplink signal resource #3 and an uplink signal resource #4. Therefore, the cell #1 corresponds to the uplink signal resource #1 and the uplink signal resource 2, and the cell #2 corresponds to the uplink signal resource #3 and the uplink signal resource #4.

S102: The terminal sends an uplink signal based on the configuration information, and the network device measures the uplink signal based on the configuration information.

It may be understood that the uplink signal in step S102 is the uplink signal corresponding to the uplink signal resource. For example, if the uplink signal resource is an SRS resource, the uplink signal is an SRS.

In this embodiment of this application, that the terminal sends an uplink signal based on the configuration information specifically includes: The terminal sends the uplink signal based on some or all of the uplink signal resources indicated by the configuration information.

In this embodiment of this application, that the network device measures the uplink signal based on the configuration information specifically includes: The network device measures the uplink signal based on some or all of the uplink signal resources indicated by the configuration information.

It may be understood that for an uplink signal resource, the network device may determine beam quality of the uplink signal resource by measuring an uplink signal corresponding to the uplink signal resource. For example, a metric of the beam quality may include but is not limited to: a reference signal received power (reference signal receiving power, RSRP), reference signal receiving quality (reference signal receiving quality, RSRQ), or a signal to interference plus noise ratio (signal to interference plus noise ratio, SINR).

The following describes step S102 with reference to various cases of the uplink signal resource.

Example 1: For an uplink signal resource indicated by the configuration information, if the uplink signal resource is an SRS resource used for antenna selection, the terminal may send an SRS to the network device based on the SRS resource in an antenna selection procedure. Correspondingly, the network device may measure the SRS in the antenna selection procedure to determine beam quality of the SRS resource.

Based on the example 1, the beam quality of the SRS resource determined by the network device may be used not only in the antenna selection procedure, but also in a BFR procedure.

Example 2: For an uplink signal resource indicated by the configuration information, if the uplink signal resource is an SRS resource used for beam management, the terminal may send an SRS to the network device based on the SRS resource in a beam management procedure. Correspondingly, the network device may measure the SRS in the beam management procedure to determine beam quality of the SRS resource.

It may be understood that the beam management procedure may be the phase U1/U2/U3 in the uplink beam training.

Based on the example 2, the beam quality of the SRS resource determined by the network device may be used not only in the beam management procedure, but also in a BFR procedure.

Example 3: For an uplink signal resource indicated by the configuration information, if the uplink signal resource is an SRS resource used for PUSCH transmission, the terminal may send an SRS to the network device based on the SRS resource in a PUSCH transmission procedure. Correspondingly, the network device measures the SRS in the PUSCH transmission procedure to determine beam quality corresponding to the SRS resource.

Based on the example 3, the beam quality of the SRS resource determined by the network device may be used not only in the PUSCH transmission procedure, but also in a BFR procedure.

It may be understood that, for the example 1 to example 3, the terminal reuses some current procedures (for example, the antenna selection procedure) to send the uplink signal, and the network device reuses some current procedures to measure the uplink signal, thereby reducing overheads of system resources. In addition, when the network device reuses some current procedures to measure the uplink signal, the network device does not need to measure the beam quality in another scenario, thereby reducing power consumption of the network device.

The following describes a specific implementation of step S102 with reference to a specific application scenario.

Implementation 1: In a scenario in which the terminal accesses only one serving cell, step S102 may be specifically implemented as: The terminal sends the uplink signal based on the M uplink signal resources; and correspondingly, the network device measures the uplink signal based on the M uplink signal resources.

Implementation 2: In a scenario in which the terminal accesses a plurality of serving cells, step S102 may be specifically implemented as: For each of the plurality of serving cells, the terminal sends the uplink signal based on at least one uplink signal resource corresponding to the serving cell; and correspondingly, the network device measures the uplink signal based on the at least one uplink signal resource corresponding to the serving cell.

For example, the terminal accesses a cell #1, a cell #2, a cell #3, and a cell #4. The configuration information indicates an uplink signal resource #1, an uplink signal resource #2, an uplink signal resource #3, and an uplink signal resource #4. The cell #1 corresponds to the uplink signal resource #1 and the uplink signal resource #2; the cell #2 corresponds to the uplink signal resource #3 and the uplink signal resource #4; and the cell #3 and the cell #4 do not correspond to any uplink signal resource indicated by the configuration information. In this case, for the cell #1, the terminal sends the uplink signal based on the uplink signal resource #1 and the uplink signal resource #2; for the cell #2, the terminal sends the uplink signal based on the uplink signal resource #3 and the uplink signal resource #4; and for the cell #3 and the cell #4, because the cell #3 and the cell #4 do not correspond to any uplink signal resource indicated by the configuration information, the terminal does not send the uplink signal. Correspondingly, for the cell #1, the network device measures the uplink signal based on the uplink signal resource #1 and the uplink signal resource #2; for the cell #2, the network device measures the uplink signal based on the uplink signal resource #3 and the uplink signal resource #4; and for the cell #3 and the cell #4, the network device does not measure the uplink signal.

Implementation 3: In a scenario in which the terminal accesses a plurality of serving cells, step S102 may be specifically implemented as: For each of at least one serving cell in which a beam failure occurs, the terminal sends the uplink signal based on at least one uplink signal resource corresponding to the serving cell; and correspondingly, the network device measures the uplink signal based on the at least one uplink signal resource corresponding to the serving cell.

For example, the terminal accesses a cell #1, a cell #2, a cell #3, and a cell #4. The configuration information indicates an uplink signal resource #1, an uplink signal resource #2, an uplink signal resource #3, and an uplink signal resource #4. The cell #1 corresponds to the uplink signal resource #1 and the uplink signal resource #2; the cell #2 corresponds to the uplink signal resource #3 and the uplink signal resource #4; and the cell #3 and the cell #4 do not correspond to any uplink signal resource indicated by the configuration information. It is assumed that a beam failure occurs in the cell #1, and no beam failure occurs in the cell #2, the cell 3, and the cell #4. In this case, the terminal sends the uplink signal based on the uplink signal resource #1 and the uplink signal resource #2 that correspond to the cell #1; and correspondingly, the network device measures the uplink signal based on the uplink signal resource #1 and the uplink signal resource #2 that correspond to the cell #1.

S103: When a beam failure occurs, the network device sends a first response message to the terminal based on a measurement result of the uplink signal, and the terminal receives the first response message based on the uplink signal.

The first response message is used to enable the terminal to determine that a beam failure recovery succeeds. Optionally, the first response message may have another name, such as a beam failure recovery response. This embodiment of this application is not limited thereto.

The beam failure specifically means that the beam failure occurs in at least one serving cell. It may be understood that the terminal may determine whether a beam failure occurs in a serving cell by using a method in a conventional technology.

When determining that the beam failure occurs in the serving cell, the terminal may send a notification message to the network device, so that the network device can learn that the beam failure occurs in the serving cell. The notification message may be specifically implemented as a first request message in the following description.

It should be noted that for a serving cell in which a beam failure occurs, if the serving cell in which the beam failure occurs corresponds to at least one uplink signal resource, the measurement result of the uplink signal may include beam quality of each of the at least one uplink signal resource corresponding to the serving cell. Therefore, the network device may determine, based on the measurement result of the uplink signal, a new beam of the serving cell in which the beam failure occurs. There is reciprocity between the new beam and an uplink beam corresponding to a target uplink signal resource.

For example, the target uplink signal resource may be an uplink signal resource with highest beam quality in the at least one uplink signal resource corresponding to the serving cell in which the beam failure occurs. Alternatively, the target uplink signal resource may be an uplink signal resource with beam quality reaching a preset threshold in the at least one uplink signal resource corresponding to the serving cell in which the beam failure occurs. Optionally, the preset threshold may be $Q_{in,LR}$, or may be another value. This is not limited in this embodiment of this application.

It may be understood that in the serving cell in which the beam failure occurs, the new beam is a beam used for downlink transmission after the BFR succeeds. For the terminal, the new beam of the serving cell is a receive beam of the terminal. For the network device, the new beam of the serving cell is a transmit beam of the network device.

Optionally, the first response message may be used to enable, by using following implementations, the terminal to determine that the beam failure recovery succeeds:

Implementation 1: The first response message is used to indicate a new beam of at least one serving cell in which a beam failure occurs.

For example, the first response message is used to indicate a TCI state corresponding to the at least one serving cell in which the beam failure occurs. Optionally, the TCI state is used to indicate QCL-Type D.

For another example, the first response message is used to indicate an index of a new beam of at least one serving cell in which a beam failure occurs.

Optionally, when the terminal accesses only one serving cell, the first response message is carried in signaling of the serving cell. When the terminal accesses a plurality of serving cells, the first response message may be carried in signaling of a cell in which no beam failure occurs.

For example, in a CA scenario, that the first response message may be carried in signaling of a cell in which no beam failure occurs includes: The first response message is carried in a primary cell or a secondary cell in which no beam failure occurs.

For example, in a DC scenario, that the first response message may be carried in signaling of a cell in which no beam failure occurs includes: The first response message is carried in a primary cell, a primary secondary cell in which no beam failure occurs, or a secondary cell in which no beam failure occurs.

Optionally, the first response message may be carried in signaling of a cell in which a beam failure occurs.

The foregoing signaling may be RRC signaling, MAC-CE signaling, or downlink control information (downlink control information, DCI). The RRC signaling and the MAC-control element (control element, CE) signaling are carried on a physical downlink shared channel (physical downlink shared channel, PDSCH). The DCI is carried on a PDCCH.

It may be understood that, the first response message may be sent as a whole, or may be divided into a plurality of sub-messages and sent separately. Optionally, when the first response message is divided into a plurality of sub-messages, each of the plurality of sub-messages corresponds to one serving cell in which a beam failure occurs, and the sub-message may be used to indicate a new beam of the serving cell in which the beam failure occurs and that corresponds to the sub-message.

Implementation 2: A beam for transmitting the first response message is a new beam of at least one serving cell in which a beam failure occurs.

That is, for a serving cell in which a beam failure occurs, the network device may use a new beam of the serving cell in which the beam failure occurs to send the first response message. In this way, after the terminal successfully receives the first response message, the terminal may determine that a beam for transmitting the first response message is the new beam of the serving cell in which the beam failure occurs.

The foregoing new beam may be a default beam or a beam with highest beam quality.

For example, a beam failure occurs in a cell #1 and a cell #2. For the cell #1, the network device transmits the first response message on a beam whose index is 1 of the cell #1, so that the terminal can determine that the beam whose index is 1 is a new beam of the cell #1. For the cell #2, the network device transmits the first response message on a beam whose index is 4 of the cell #2, so that the terminal can determine that the beam whose index is 4 is a new beam of the cell #2.

Optionally, the first response message may be carried on a PDCCH. In this case, that the terminal successfully receives the first response message may mean that the terminal successfully receives the PDCCH.

Based on the technical solution shown in FIG. 6, the network device sends the configuration information to the terminal, so that the terminal learns of the plurality of uplink signal resources. In this way, the terminal may send the uplink signal based on the configuration information, and the network device measures the uplink signal to determine beam quality of the plurality of uplink signal resources.

Based on beam reciprocity, after the network device finishes measuring an uplink, the network device may determine a transmit beam, used for a downlink, of the network device. In addition, the terminal can determine, based on an indication of the network device, a receive beam, used for the downlink, of the terminal. Therefore, when a beam failure occurs, the network device sends the first response message to the terminal based on the measurement result of the uplink signal to complete the beam failure recovery. As can be learned, in the technical solution provided in this embodiment of this application, the terminal does not need to measure a downlink reference signal to determine beam quality of a plurality of downlink reference signal resources, thereby reducing implementation complexity of the terminal in a BFR procedure.

It may be understood that in consideration of compatibility, the configuration information in step S101 may alternatively be used to indicate N downlink reference signal resources, and N is a positive integer. The foregoing downlink reference signal resource is a CSI-RS resource or an SSB resource.

For an implementation by using which the configuration information is used to indicate the N downlink reference signal resources, refer to the implementation by using which the configuration information is used to indicate the M uplink signal resources in the foregoing description.

For example, the configuration information may indicate the M uplink signal resources and the N downlink reference signal resources by using any one of the following implementations:

(1) The configuration information indicates a resource set. The resource set includes M uplink signal resources and N downlink reference signal resources. For example, the resource set may be the set $\bar{q}_1$ mentioned in the foregoing description or another set.

(2) The configuration information indicates a first resource set and a second resource set. The first resource set includes M uplink signal resources. The second resource set includes N downlink signal resources. For example, the first resource set may be the set $\bar{q}_1$ mentioned in the foregoing description, and the second resource set may be a set other than the set $\bar{q}_1$.

In this embodiments of this application, if the configuration information indicates M uplink reference signal resources and N downlink reference signal resources, when a beam failure occurs, the network device and the terminal may use a BFR method in a conventional technology, the network device and the terminal may use the BFR method shown in FIG. 6, or the network device and the terminal may use a combination of a BFR method in a conventional technology and the BFR method shown in FIG. 6.

Figure 7:
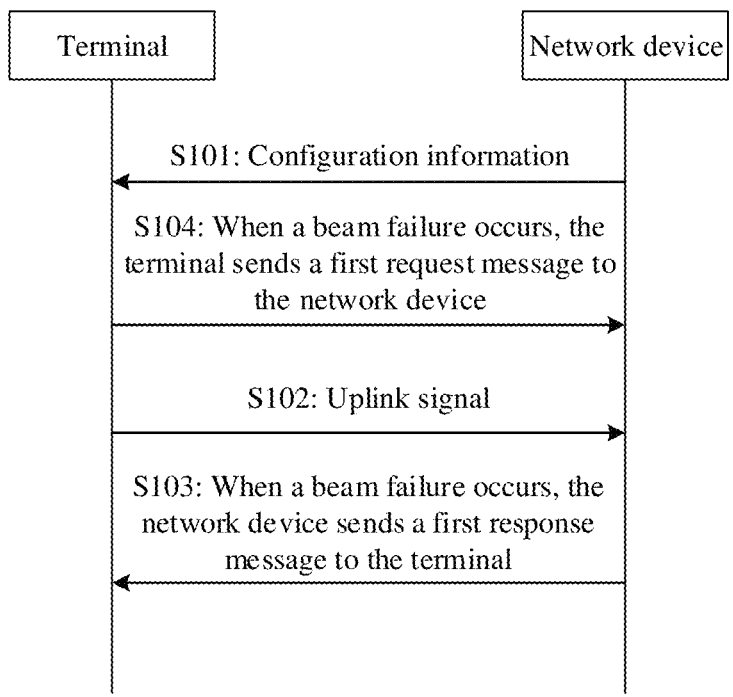
FIG. 7 is a flowchart of a beam failure recovery method according to an embodiment of this application.
Figure 8:
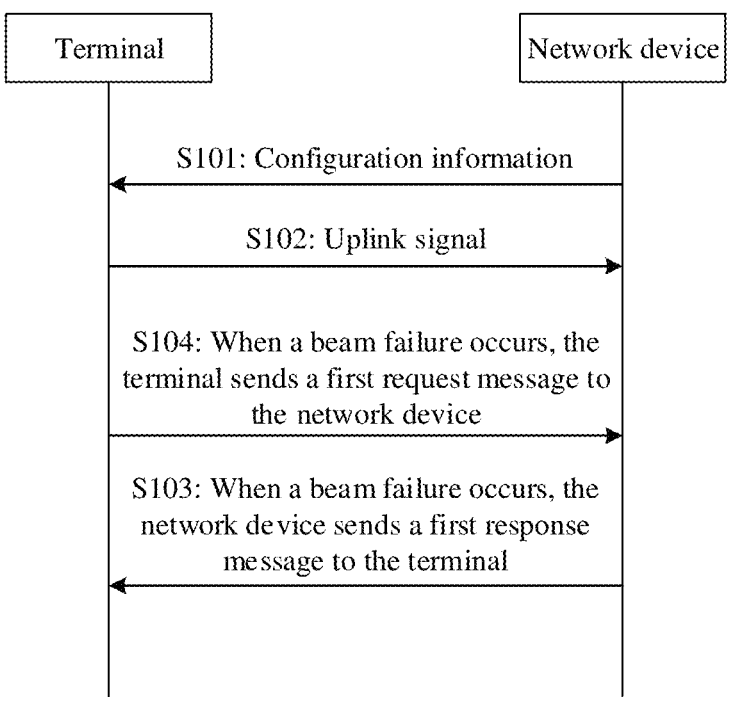
FIG. 8 is a flowchart of another beam failure recovery method according to an embodiment of this application.

Optionally, as shown in FIG. 7 or FIG. 8, the beam failure recovery method further includes step S104.

S104: When a beam failure occurs, the terminal sends a first request message to the network device, and the network device receives the first request message sent by the terminal.

The first request message is used to request a beam failure recovery. Optionally, the first request message may alternatively have another name, such as a beam failure recovery request. This embodiment of this application is not limited thereto.

In a possible implementation, when the terminal accesses a plurality of cells, the terminal sends the first request message in a primary cell, or the terminal sends the first request message in a secondary cell. For example, the primary cell may be a cell with a frequency of 1 (frequency 1, F1), the secondary cell may be a cell with a frequency of 2 (frequency 2, F2). F1 may be a high frequency, and F2 may be a low frequency. This embodiment of this application is not limited thereto.

In this embodiment of this application, the first request message may include first indication information and/or second indication information. The first indication information is used to indicate that a beam failure occurs in a serving cell. The second indication information is used to indicate at least one serving cell in which a beam failure occurs. For example, the second indication information may include an index of the at least one serving cell in which the beam failure occurs.

Optionally, the first request message may further include third indication information, and the third indication information is used to indicate that no new beam has been identified by the terminal.

For example, if the configuration information further indicates the N downlink reference signal resources, the terminal may measure a downlink reference signal to determine beam quality of the N downlink reference signal resources. If the beam quality of none of the N downlink reference signal resources satisfies a preset threshold (for example, $Q_{out,LR}$ in the foregoing description), the terminal has not identified a new beam. In this case, the first request message sent by the terminal may include the third indication information.

As shown in FIG. 7, step S104 may be performed before step S102; or as shown in FIG. 8, step S104 may be performed after step S102.

In this embodiment of this application, when the terminal accesses a plurality of serving cells, if step S102 is performed before step S104, step S102 may use the implementation 2 in the foregoing description.

In this embodiment of this application, when the terminal accesses a plurality of serving cells, if step S102 is performed after step S104, step S102 may use the implementation 2 or the implementation 3 in the foregoing description. For example, when the first request message includes the first indication information and/or the second indication information, step S102 may use the implementation 2 or the implementation 3 in the foregoing description. For another example, when the first request message includes the first indication information, step S102 may use the implementation 2 in the foregoing description; and when the first request message includes the first indication information and the second indication information or the first request message includes the second indication information, step S102 may use the implementation 3 in the foregoing description.

It may be understood that if step S102 is performed before step S104, when a beam failure occurs in a serving cell accessed by the terminal, after the network device receives the first request message, the network device may directly send the first response message to the terminal based on the previously obtained measurement result of the uplink signal, and does not need to perform a measurement procedure of the uplink signal again, thereby reducing a delay of the BFR.

It may be understood that if step S102 is performed after step S104, when a beam failure occurs in a serving cell accessed by the terminal, after the network device receives the first request message, the network device measures the uplink signal to obtain a measurement result of the uplink signal, so that the network device sends the first response message to the terminal based on the measurement result of the uplink signal. Because the measurement procedure of the uplink signal is performed after a beam failure occurs in a serving cell, the measurement result of the uplink signal obtained by the network device is precise, thereby facilitating selection of a proper new beam. In addition, this can reduce complexity of time-to-time tracking measurement of the terminal.

Optionally, in the embodiments shown in FIG. 6 to FIG. 8, the uplink signal resource may be replaced with a preamble resource and/or an uplink signal resource that has a QCL relationship with a resource for carrying or scheduling an Msg 3.

The foregoing mainly describes the solutions provided in the embodiments of this application from a perspective of interaction between network elements. It may be understood that, to implement the foregoing functions, each of network elements such as the network device and the terminal includes a corresponding hardware structure and/or software module for performing each function. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that division into the modules is an example and is merely logical function division in the embodiments of this application. During actual implementation, another division manner may be used. An example in which each functional module is obtained through division based on each corresponding function is used below for description.

Figure 9:
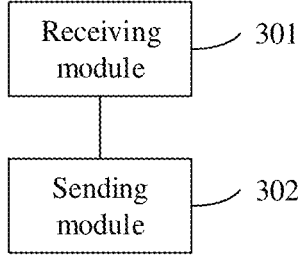
FIG. 9 is a schematic diagram of a structure of a terminal according to an embodiment of this application.

FIG. 9 is a schematic diagram of a structure of a terminal according to an embodiment of this application. As shown in FIG. 9, the terminal includes a receiving module 301 and a sending module 302. The sending module 302 is configured to support the terminal in performing step S102 in FIG. 6 and step S104 in FIG. 7 or FIG. 8, and/or is configured to support another procedure of the technical solutions described in this specification. The receiving module 301 is configured to support the terminal in performing steps S101 and S103 in FIG. 6, and/or is configured to support another procedure of the technical solutions described in this specification.

In an example, with reference to the terminal shown in FIG. 5, the receiving module 301 and the sending module 302 in FIG. 9 may be implemented by the transceiver 103 in FIG. 5. This is not limited in this embodiment of this application.

An embodiment of this application further provides a computer-readable storage medium. The computer-readable storage medium stores computer instructions. When the computer-readable storage medium runs on the terminal shown in FIG. 5, the terminal is enabled to perform the method shown in FIG. 6, FIG. 7, or FIG. 8. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state disk (solid state disk, SSD)), or the like.

An embodiment of this application further provides a computer program product including computer instructions. When the computer program product runs on the terminal shown in FIG. 3, the terminal is enabled to perform the method shown in FIG. 6, FIG. 7, or FIG. 8.

The terminal, the computer storage medium, and the computer program product provided in the embodiments of this application are all configured to perform the methods provided above. Therefore, for beneficial effects that can be achieved by the terminal, the computer storage medium, and the computer program product, refer to the beneficial effects corresponding to the methods provided above. Details are not described herein again.

Figure 10:
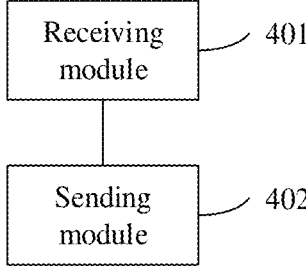
FIG. 10 is a schematic diagram of a structure of a network device according to an embodiment of this application.

FIG. 10 is a schematic diagram of a structure of a network device according to an embodiment of this application. As shown in FIG. 10, the network device includes a receiving module 401 and a sending module 402. The sending module 402 is configured to support the network device in performing steps S101 and S103 in FIG. 6, and/or is configured to support another procedure of the technical solutions described in this specification. The receiving module 401 is configured to support the network device in performing step S102 in FIG. 6 and step S104 in FIG. 7 or FIG. 8, and/or is configured to support another procedure of the technical solutions described in this specification.

In an example, with reference to the network device shown in FIG. 5, the receiving module 401 and the sending module 402 in FIG. 10 may be implemented by the transceiver 203 in FIG. 5. This is not limited in this embodiment of this application.

An embodiment of this application further provides a computer-readable storage medium. The computer-readable storage medium stores computer instructions. When the computer-readable storage medium runs on the network device shown in FIG. 5, the network device is enabled to perform the method shown in FIG. 6, FIG. 7, or FIG. 8.

An embodiment of this application further provides a computer program product including computer instructions. When the computer program product runs on the network device shown in FIG. 5, the network device is enabled to perform the method shown in FIG. 6, FIG. 7, or FIG. 8.

The network device, the computer storage medium, and the computer program product provided in the embodiments of this application are all configured to perform the methods provided above. Therefore, for beneficial effects that can be achieved by the network device, the computer storage medium, and the computer program product, refer to the beneficial effects corresponding to the methods provided above. Details are not described herein again.

Figure 11:
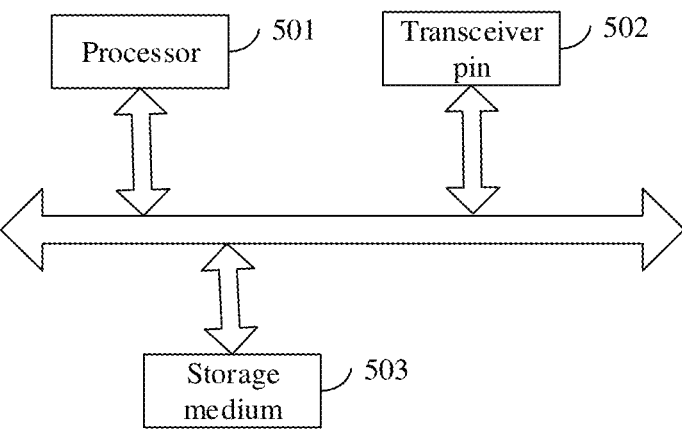
FIG. 11 is a schematic diagram of a structure of a chip according to an embodiment of this application.

FIG. 11 is a schematic diagram of a structure of a chip according to an embodiment of this application. The chip shown in FIG. 11 may be a general-purpose processor, or may be a dedicated processor. The chip includes a processor 501. The processor 501 is configured to support a communication apparatus in performing the technical solution shown in FIG. 6, FIG. 7, or FIG. 8.

Optionally, the chip further includes a transceiver pin 502 used as a communication interface. The transceiver pin 502 is configured to accept control of the processor 501, and is configured to support the communication apparatus in performing the technical solution shown in FIG. 6, FIG. 7, or FIG. 8.

Optionally, the chip shown in FIG. 11 may further include a storage medium 503.

It should be noted that the chip shown in FIG. 11 may be implemented by using the following circuit or component: one or more field programmable gate arrays (field programmable gate arrays, FPGAs), a programmable logic device (programmable logic device, PLD), a controller, a state machine, gate logic, a discrete hardware component, any other appropriate circuit, or any combination of circuits that can perform various functions described in this application.

Although this application is described with reference to the embodiments herein, a person skilled in the art may understand and implement another variation of the disclosed embodiments by viewing the accompanying drawings, disclosed content, and the appended claims. In the claims, the term "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A beam failure recovery method, comprising:

receiving configuration information sent by a network device, wherein the configuration information is used to indicate M uplink signal resources, and M is a positive integer;

sending an uplink signal based on the configuration information;

sending, by a terminal, a first request message when a beam failure occurs, wherein the first request message is used to request a beam failure recovery; and receiving, from the network device, a first response message based on a measurement result of the uplink signal by the network device when a beam failure occurs, wherein the first response message is used to determine that a beam failure recovery succeeds.

2. The beam failure recovery method according to claim 1, wherein the uplink signal resource is a sounding reference signal (SRS) resource.

3. The beam failure recovery method according to claim 2, wherein the SRS resource is an SRS resource used for antenna selection, an SRS resource used for physical uplink shared channel transmission, an SRS resource used for beam management, or an SRS resource used for new beam detection.

4. The beam failure recovery method according to claim 1, wherein sending the first request message comprises sending the first request message before the sending an uplink signal based on the configuration information.

5. The beam failure recovery method according to claim 1, wherein sending the first request message comprises sending the first request message after the sending an uplink signal based on the configuration information.

6. The beam failure recovery method according to claim 1, wherein when the terminal accesses one serving cell, the sending an uplink signal based on the configuration information comprises:

sending the uplink signal based on the M uplink signal resources.

7. The beam failure recovery method according to claim 4, wherein the first request message comprises first indication information, and the first indication information is used to indicate that a beam failure occurs in a serving cell.

8. A communication apparatus, comprising: a processor and a memory connected to the processor, wherein the communication apparatus is terminal, and the memory is configured to store computer-executable instructions, and the processor executes the computer-executable instructions stored in the memory, to enable the apparatus to implement:

receiving configuration information sent by a network device, wherein the configuration information is used to indicate M uplink signal resources, and M is a positive integer;

sending an uplink signal based on the configuration information;

sending a first request message when a beam failure occurs, wherein the first request message is used to request a beam failure recovery; and receiving, from the network device, a first response message based on a measurement result of the uplink signal by the network device when a beam failure occurs, wherein the first response message is used to determine that a beam failure recovery succeeds.

9. The communication apparatus according to claim 8, wherein the uplink signal resource is a sounding reference signal (SRS) resource.

10. The communication apparatus according to claim 9, wherein the SRS resource is an SRS resource used for antenna selection, an SRS resource used for physical uplink shared channel transmission, an SRS resource used for beam management, or an SRS resource used for new beam detection.

11. The communication apparatus according to claim 8, wherein to enable the apparatus to implement:

sending the first request message when a beam failure occurs before sending the uplink signal.

12. The communication apparatus according to claim 8, wherein to enable the apparatus to implement:

sending the first request message when a beam failure occurs after sending the uplink signal.

13. The communication apparatus according to claim 8, wherein to enable the apparatus to implement:

sending the uplink signal based on the M uplink signal resources when the terminal accesses one serving cell.

14. The communication apparatus according to claim 11, wherein the first request message comprises first indication information, and the first indication information is used to indicate that a beam failure occurs in a serving cell.

15. A communication apparatus, comprising: a processor and a memory connected to the processor, wherein the communication apparatus is a network device, and the memory is configured to store computer-executable instructions, and the processor executes the computer-executable instructions stored in the memory, to enable the apparatus to implement:

sending configuration information to a terminal, wherein the configuration information is used to indicate M uplink signal resources, and M is a positive integer;

receiving an uplink signal from the terminal based on the configuration information;

receiving, from the terminal, a first request message when a beam failure occurs, wherein the first request message is used to request a beam failure recovery;

measuring an uplink signal based on the configuration information;

determining whether a beam failure recovery succeeds based on a measurement result of the uplink signal; and sending, to the terminal, a first response message to the terminal based on the measurement result of the uplink signal and the receipt of the first request message, wherein the first response message is used to enable the terminal to determine that the beam failure recovery succeeds.

16. The communication apparatus according to claim 15, wherein the uplink signal resource is a sounding reference signal (SRS) resource.

17. The communication apparatus according to claim 16, wherein the SRS resource is an SRS resource used for antenna selection, an SRS resource used for physical uplink shared channel transmission, an SRS resource used for beam management, or an SRS resource used for new beam detection.

18. The communication apparatus according to claim 15, wherein to enable the apparatus to implement:

receiving the first request message sent by the terminal before measuring the uplink signal.

19. The communication apparatus according to claim 15, wherein to enable the apparatus to implement:

receiving a first request message sent by the terminal after measuring the uplink signal.

20. The communication apparatus according to claim 15, wherein to enable the apparatus to implement:

measuring the uplink signal based on the M uplink signal resources when the terminal accesses one serving cell.

* * * * *